UNITED STATES PATENT OFFICE

MELCHIOR BOENIGER, OF BASEL, SWITZERLAND, ASSIGNOR TO THE FIRM: "CHEMICAL WORKS FORMERLY SANDOZ", OF BASEL, SWITZERLAND

DIAZOTIZABLE PRIMARY DISAZO DYESTUFFS

No Drawing. Application filed April 2, 1926, Serial No. 99,383, and in Great Britain February 19, 1926.

This invention relates to an improvement in or a modification of that described in the U. S. Patent No. 1,686,947, dated October 9, 1928, by using as components for the manufacture of diazotizable azo-dyestuffs 3'-amino-4'-methyl-5'-sulpho-1'-phenyl-5 - pyrazolones, corresponding to the general formula

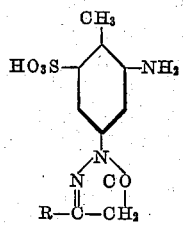

where R stands for $CH_3$ or COOH.

These new pyrazolone compounds can be obtained by condensation of 2-nitro-4-tolyl-hydrazine-6-sulphonic acid with ethyl acetoacetate or ethyl oxalyl-acetate and subsequent reduction.

By coupling one molecule of a tetrazodiaryl with two molecules of these 3'-amino-4'-methyl-5'-sulpho-1-phenyl-5-pyrazolones or by combination of the intermediate products of one molecule of a tetrazodiaryl and one molecule of an arylortho-hydroxycarboxylic acid with one molecule of a 3'-amino-4'-methyl-5'-sulpho-1-phenyl-5-pyrazolone or by coupling the intermediate product of one molecule of a tetrazodiaryl and one molecule of a 3'-amino-4'-methyl-5'-sulpho - 1-phenyl - 5-pyrazolone with one molecule of an azo component valuable substantive azo-dyestuffs are obtained, which when diazotized on the fibre can be developed with unsulphonated azo components for instance betanaphthol, metadiamines, phenylmethylpyrazolone to shades varying from orange to red, heliotrope and dark brown, which are fast to washing and can be discharged with formaldehyde-hydrosulfite to pure white effects.

Furthermore, the direct dyeings can also be fixed with formaldehyde or by an after treatment with paranitro-diazobenzene. The same diazotizable azo-dyestuffs can be obtained by substituting in the above mentioned process the 3'-amino-4'-methyl-5'-sulpho-1-phenyl-5-pyrazolones by the corresponding 3'-nitro-4'-methyl-5'-sulpho-1-phenyl-5-pyrazolones, and by reducing in the nitro-dyestuffs thus obtained the nitro group to the amino group by an appropriate treatment with sodium sulphide.

The new diazotizable azo-dyestuffs constitute in a dry state, brick red to brown black powders easily soluble in water with orange to violet brown colour and dissolving in concentrated sulphuric acid with red violet to dark blue colorations.

The following examples illustrate the invention, the parts being by weight:

Example 1

Diazotize 24.4 parts of dianisidine and add to the solution thereby obtained at 5° C. the neutral solution of the trisodium salt corresponding at 62.6 parts of 3'-amino-4'-methyl-5'-sulpho-1-phenyl-5-pyrazolone-3-carboxylic acid. After stirring during an hour, the combination is finished. Add the solution of 20 parts of sodium carbonate, heat to boiling and precipitate from the dark violet solution and dyestuff by means of common salt.

It constitutes in dry state a brown-black powder, easily soluble in water with red-violet colour, whereas it dissolves in concentrated sulphuric acid with blue coloration.

It produces on unmordanted cotton heliotrope shades, which by diazotizing on the fibre and developing with betanaphthol become very fast to washing without changing materially in tone.

The dyestuff obtained according to this example has the following formula:

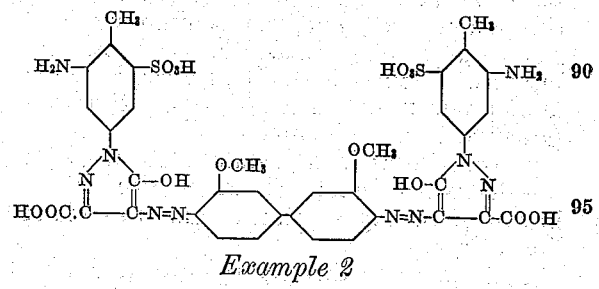

Example 2

18.4 parts of benzidine are diazotized and combined with 14.5 parts of salicylic acid in sodium carbonate solution to form the intermediate product. As soon as its formation is complete, the solution of the disodium salt of 28.3 parts of 3′-amino-4′-methyl-5′-sulpho-1-phenyl-3-methyl-5-pyrazolone is added. After stirring during some hours, the yellow brown intermediate product is transformed into the disazo-dyestuff, which heated up to boiling enters in solution and can be precipitated by addition of common salt in form of a bright orange powder.

The new azo-dyestuff dissolves in water with yellow-orange, in concentrated sulphuric acid with red-violet coloration.

It dyes unmordanted cotton bright orange shades; diazotized on the fibre they can be developed with beta-naphthol to reddish orange shades, fast to washing. Compared with the corresponding dyestuff from 2′-methyl-3′-amino-5′-sulpho-1-phenyl-3-methyl-5-pyrazolone they are substantially redder in tone, in direct as well as in developed dyeings.

The dyestuff obtained according to this example has the following formula:

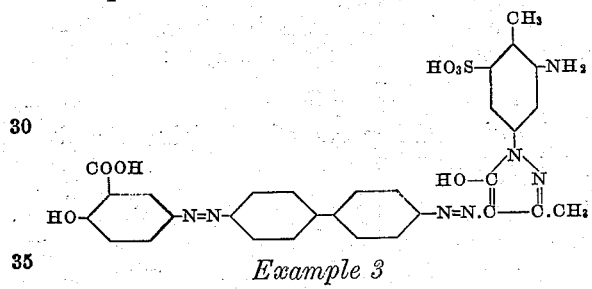

Example 3

Pour into the tetrazo solution corresponding to 21.2 parts of tolidine, cooled down to 5° C., the neutral solution of the disodium salt of 31.3 parts of 3′-nitro-4′-methyl-5′-sulpho-1-phenyl-3-methyl-5-pyrazolone. A reddish orange intermediate product is precipitated, which is coupled to the disazo-dyestuff by addition of 24.5 parts of 1.6 (1.7) naphthylamine sulphonic acid sodium salt dissolved in 250 parts of water. The nitro disazo-dye hereby obtained forms a brownish black precipitate. In order to reduce the nitro group, add to the nitro disazo-dyestuff rendered slightly alkaline with sodium carbonate, 65 parts of crystallized sodium sulphide, heat slowly up to 50° C. and maintain this temperature until the sodium sulphide has dissappeared. Neutralize the brown solution with muriatic acid and precipitate the amino pyrazolone disazo-dyestuff thus obtained by means of common salt.

It constitutes in dry state a brown-black powder, which dissolves in water with yellow-brown, in strong sulphuric acid with violet blue coloration.

It dyes cotton directly red-brown shades, which diazotized and developed with beta-naphthol change into chestnut brown, fast to washing.

The dyestuff obtained according to this example has the following formula:

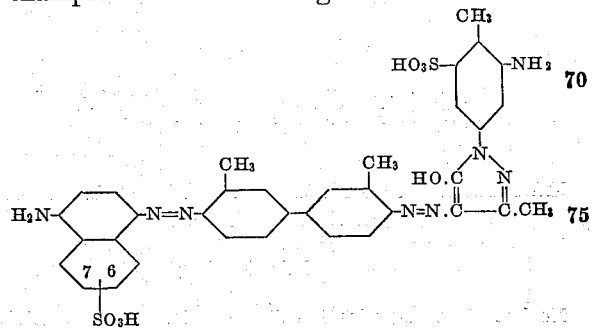

Example 4

21.2 parts of tolidine are diazotized and combined with 15.5 parts of orthohydroxycresotinic acid in sodium carbonate solution to the intermediate product. As soon as free tetrazoditolyl can no more be traced, the sodium carbonate solution of 31.3 parts of 3′-amino-4′-methyl-5′-sulpho-1-phenyl-5-pyrazolone-3-carboxylic acid is added. After stirring during some hours, the combination is completed. Heat up to boiling and precipitate the dyestuff by means of common salt. It forms in dry state a red-brown powder, dissolving in water with brown-red, in concentrated sulphuric acid with violet coloration.

It dyes unmordanted cotton red shades, which by diazotizing and developing with betanaphthol are fixed to bright scarlet shades, fast to washing and light.

The dyestuff obtained according to this example has the following formula:

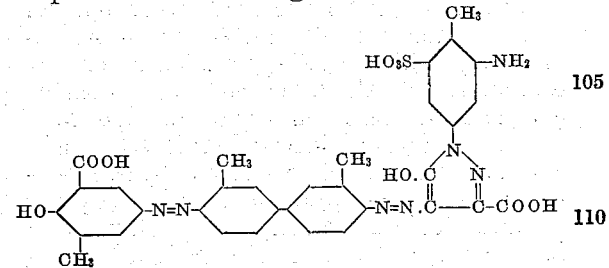

What I claim is:

1. The herein described new diazotizable primary disazo-dyestuffs as obtained by coupling a tetrazotized diamine of the diaryl series and at least one molecule of a 3′-amino-4′-methyl-5′-sulpho-1-phenyl-5-pyrazolone and an azocomponent and having most probably the following general formula:

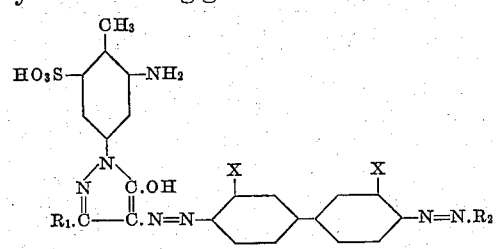

wherein $R_1$ stands for $CH_3$ or $COOH$, X stands for hydrogen, $CH_3$ or $OCH_3$, and $R_2$ stands for an azocomponent, dyeing unmordanted cotton in orange to red shades, which, diazotized on the fibre, can be developed to similar shades, fast to washing, constituting in the form of their sodium salts red brown to brown black powders, easily soluble in water with orange red to red violet colour, and dissolving in concentrated sulphuric acid with red violet to blue coloration.

2. The herein described new diazotizable primary disazo-dyestuffs obtained by coupling a tetrazotized diamine of the diaryl series with one molecule of a 3'-amino-4'-methyl-5'-sulpho-1-phenyl-5-pyrazolone and one molecule of an ortho-hydroxycarboxylic acid, and having most probably the following general formula:

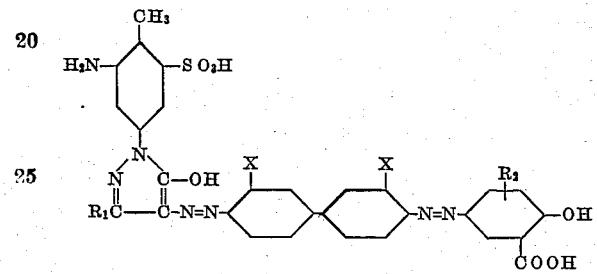

wherein $R_1$ stands for $CH_3$ or COOH, X stands for hydrogen, $CH_3$ or $OCH_3$, and $R_2$ stands for hydrogen or $CH_3$, dyeing unmordanted cotton in orange to red shades, which when diazotized on the fibre can be developed to similar shades, fast to washing, constituting in the form of their sodium salts brick red to brown black powders, easily soluble in water with orange to violet brown colour, and dissolving in concentrated sulphuric acid with red violet to black violet coloration.

3. The herein described new diazotizable primary disazo-dyestuffs as obtained by coupling one molecule of a tetrazotized diamine of the diaryl series with one molecule of a 3'-amino-4'-methyl-5'-sulpho-1-phenyl-5-pyrazolone and one molecule of a methylorthohydroxycarboxylic acid, said dyestuffs having the general formula:

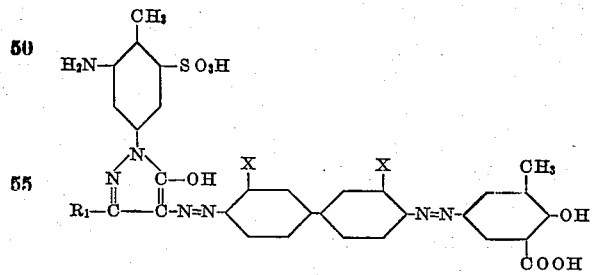

wherein $R_1$ stands for $CH_3$ or COOH and X stands for hydrogen, $CH_3$ or $OCH_3$, dyeing unmordanted cotton in orange to red shades which when diazotized on the fibre can be developed to similar shades, fast to washing, constituting in the form of their sodium salts brick red to brown red powders, easily soluble in water with orange to brown red colour, and dissolving in concentrated sulphuric acid with red violet to violet coloration.

In witness whereof I have hereunto signed my name this 22nd day of March, 1926.

MELCHIOR BOENIGER.